United States Patent
Dong et al.

(10) Patent No.: US 11,951,460 B1
(45) Date of Patent: Apr. 9, 2024

(54) PREPARATION METHOD AND APPLICATION OF TAILINGS-BASED ZEOLITE@CDs-TiO$_2$ COMPOSITE PHOTOCATALYST

(71) Applicant: Taiyuan University of Technology, Taiyuan (CN)

(72) Inventors: Xianshu Dong, Taiyuan (CN); Yuping Fan, Taiyuan (CN); Xiaomin Ma, Taiyuan (CN); Jiaqi Guo, Taiyuan (CN); Yuanpeng Fu, Taiyuan (CN); Ruifeng Guo, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/466,851

(22) Filed: Sep. 14, 2023

(30) Foreign Application Priority Data

Apr. 24, 2023 (CN) .......................... 202310447874.0

(51) Int. Cl.
*B01J 29/04* (2006.01)
*B01J 21/06* (2006.01)
(Continued)

(52) U.S. Cl.
CPC ............. *B01J 29/04* (2013.01); *B01J 21/063* (2013.01); *B01J 21/18* (2013.01); *B01J 35/39* (2024.01);
(Continued)

(58) Field of Classification Search
CPC ... B01J 21/06; B01J 21/18; B01J 35/00; B01J 37/02; B01J 37/04; B01J 29/04; C02F 1/46; C02F 1/32
See application file for complete search history.

(56) References Cited

FOREIGN PATENT DOCUMENTS

CN            104119164 B  *  5/2016

OTHER PUBLICATIONS

Translation—CN-104119164-B (Year: 2016).*
(Continued)

*Primary Examiner* — Walter D. Griffin
*Assistant Examiner* — Cameron J Allen
(74) *Attorney, Agent, or Firm* — Zhigang Ma

(57) ABSTRACT

A preparation method and an application of a tailings-based zeolite@carbon dots-titanium dioxide (CDs-TiO$_2$) composite photocatalyst are provided, which relates to the field of solid waste utilization technologies. The preparation method includes performing an acidification treatment on tailings powder and then roasting to obtain modified tailings powder; adding the modified tailings powder and titanium dioxide into lye to obtain mixed suspension; stirring and aging the mixed suspension under ultraviolet irradiation to obtain an aged suspension, performing a hydrothermal reaction on the aged suspension to obtain a product, filtering, washing and drying the product to obtain the tailings-based zeolite@CDs-TiO$_2$ composite photocatalyst. The tailings-based zeolite@CDs-TiO$_2$ composite photocatalyst is used to degrade methylene blue, and the photocatalyst is used to treat an organic pollutant in water, which has advantages including a shift in response wavelength and a high photocatalyst activity, and the composite photocatalyst can be applied in an environmental protection field.

6 Claims, 8 Drawing Sheets

(51) Int. Cl.
*B01J 21/18* (2006.01)
*B01J 35/39* (2024.01)
*B01J 37/02* (2006.01)
*B01J 37/04* (2006.01)
*B01J 37/06* (2006.01)
*B01J 37/08* (2006.01)
*B01J 37/34* (2006.01)
*C02F 1/32* (2023.01)
*C02F 1/72* (2023.01)
*C02F 101/30* (2006.01)

(52) U.S. Cl.
CPC ....... *B01J 37/0201* (2013.01); *B01J 37/0236* (2013.01); *B01J 37/04* (2013.01); *B01J 37/06* (2013.01); *B01J 37/082* (2013.01); *B01J 37/343* (2013.01); *C02F 1/32* (2013.01); *C02F 1/725* (2013.01); *B01J 2229/186* (2013.01); *C02F 2101/308* (2013.01); *C02F 2305/10* (2013.01)

(56) References Cited

OTHER PUBLICATIONS

CNIPA, Notification of a First Office Action for CN202310447874.0, dated May 24, 2023.
Taiyuan University of Technology (Applicant), Reply to Notification of a First Office Action for CN202310447874.0, w/ (allowed) replacement claims, dated May 29, 2023.
CNIPA, Notification to grant patent right for invention in CN202310447874.0, dated Jun. 5, 2023.

\* cited by examiner

PREPARATION METHOD AND APPLICATION OF TAILINGS-BASED ZEOLITE@CDs-TiO$_2$ COMPOSITE PHOTOCATALYST

TECHNICAL FIELD

The disclosure relates to the field of solid waste utilization technologies, relates to a utilization of carbon-bearing mineral tailings, and more particularly to a preparation method and an application of tailings-based zeolite@carbon dots-titanium dioxide (CDs-TiO$_2$) composite photocatalyst, which apply to a catalytic degradation of methylene blue under visible light.

BACKGROUND

In 1977, Frank and Bard used titanium dioxide to degrade cyanide in water under an ultraviolet irradiation condition, which made it possible for a photocatalytic technology to be used in wastewater treatment. A semiconductor photocatalysis technology used to degrade organic pollutants has attracted widespread attention due to its energy-saving and high efficiency. Anatase titanium dioxide is one of the most promising catalysts in photocatalysts due to its low costs, excellent photocatalytic performance, long-term stability, and environmental friendliness.

Researches commonly believe that (1) a band gap of an anatase is 3.2 electron volts (eV); (2) an ability of a surface of the anatase for adsorbing water molecules (H$_2$O) and hydroxide radical (OH·) is strong, when the surface of the anatase is excited by light quantum larger than energy of the band gap, many superoxide anion radicals (O$_2^-$·) (conduction band) and hydroxyl free radicals (OH·) (valence band) are accumulated on the surface of the anatase to create a strong oxidizing environment.

In industrial solid wastes, a production proportion of a coal-based solid waste is highest, and the coal-based solid waste mainly refers to a carbon-bearing stone like mineral with low calorific value generated during the mine production, such as coal gangue and coal tailings, and the coal-based solid waste further refers to fly ash discharged from a coal-fired power plant, a discharge amount of the coal-based solid waste is increasing year by year, which causes a series of eco-environmental problems. Preparing the carbon-bearing stone like material into a high value new material is an effective environmental protection approach and research hotspot.

Carbon dots (CDs), a new type of nano carbon, attract more attention due to its specificity. For example, its specificity includes a special up-conversion luminescence and size dependent photoluminescence characteristics, a chemical inertness, an excellent resistance to light corrosion, an excellent water solubility, and a low cytotoxicity. More and more studies are focusing on coupling the carbon dots with the titanium dioxide, a conjugate sp$^2$ structure of the CDs plays an important role for improving a photocatalytic activity of the CDs, for example, promoting excitation and separation of an electron hole pair. Methods for synthesizing the CDs are divided into two types, a "top-bottom" method and a "bottom-top" method. The "top-bottom" method synthesizes the CDs by a macroscopic carbon structure, such as a coal, a graphite, an activated carbon and a carbon black. Strong acid oxidation is an effective and convenient "bottom-top" method for extracting the CDs from a coal-based material, however, the strong acid oxidation requires an intense oxidation environment to peel and shear a macroscopic coal-based carbon structure as the CDs, thus the traditional strong acid oxidation has a problem of secondary pollution.

The O$_2^-$· and the OH· generated by the titanium dioxide can also create a green strong oxidizing environment for peeling the CDs under an ultraviolet excitation, which provides a foundation for ultraviolet assisted synthesis of the CDs. In another aspect, most of zeolite molecular sieves are formed by disaggregation and condensation rearrangement of silicate ions and silicoaluminate ions in a strongly alkaline media. After introducing the titanium dioxide into zeolite reaction solution, massive hydroxyl free radicals generated by performing an ultraviolet radiation on a surface of titanium dioxide can promote the disaggregation and condensation of the silicate ions and the silicoaluminate ions, thereby significantly accelerating a crystallization process of the zeolite molecular sieves, reducing an alkalinity required for preparing, and shortening a time required for synthesizing a zeolite.

SUMMARY

The disclosure overcomes disadvantages of the related art, and provides a preparation method and an application of a tailings-based zeolite@carbon dots-titanium dioxide (CDs-TiO$_2$) composite photocatalyst. Problems of space waste and environmental pollution caused by storage of coal-based solid waste, as well as a low visible light utilization rate of an existing powder photocatalyst, especially a difficulty of recycling are solved.

In order to achieve the above purposes, the disclosure is achieved by the following technical solutions.

A preparation method of a tailings-based zeolite@CDs-TiO$_2$ composite photocatalyst is provided, and the preparation method includes:

step 1, tailings pretreatment, including: performing an acidification treatment on tailings powder by immersing the tailings powder into acid liquor and stirring evenly to obtain acidified tailings powder; roasting the acidified tailings powder at a temperature of 700-900 Celsius degrees (° C.) under an inert gas preservation and then keeping the temperature unchanged to obtain modified tailings powder;

step 2, adding titanium dioxide (TiO$_2$) and the modified tailings powder into lye sequentially, and stirring to obtain a mixed suspension, where a weight ratio of the TiO$_2$ and the modified tailings powder is in a range of 0.5-1; and stirring and aging the mixed suspension for 8-16 hours (h) under a condition of ultraviolet irradiation to obtain an aged suspension (i.e., the mixed suspension after the aging), where a light intensity of the ultraviolet irradiation is in a range of 10-20 milliwatts per square centimeter (mW/cm$^2$);

step 3, performing a hydrothermal reaction on the aged suspension to obtain a product, filtering the product to obtain a filtered product, and washing and drying the filtered product to obtain the tailings-based zeolite@CDs-TiO$_2$ composite photocatalyst.

The tailings are a coal-based solid waste, and the tailings refer to a carbon-bearing stone like mineral with low calorific value generated during the mine production, such as a coal gangue and coal tailings.

In an embodiment, a particle size of the tailings powder is smaller than 125 microns (μm).

In an embodiment, the acidification treatment includes: adding the tailings powder into diluted hydrochloric acid with a molar concentration of 1 molar per liter (M) and performing an ultrasonic treatment on the diluted hydrochloric acid added with the tailings powder for 1.5-2.5 h.

In an embodiment, the lye is sodium hydroxide (NaOH) solution with a molar concentration of 1-3 M.

In an embodiment, a temperature of the hydrothermal reaction is in a range of 115-125° C., and a period of the hydrothermal reaction is in a range of 20-30 h.

In an embodiment, the roasting includes: introducing the inert gas into a tube furnace, heating the acidified tailings powder at a heating rate of 5 Celsius degrees per minute (° C./min) to the temperature of 700-900° C., and then roasting the acidified tailings powder at the temperature of 700-900° C.

In an embodiment, the inert gas is nitrogen ($N_2$), and a flow speed of the inert gas is 100 milliliters per minute (mL/min).

In an embodiment, a period for keeping the temperature unchanged is 1 h.

In an embodiment, the washing and drying in step 3 includes: washing, by using deionized water, the filtered product to neutrality to obtain a washed product, and freezing and drying the washed product for 48 h to obtain the tailings-based zeolite@CDs-$TiO_2$ composite photocatalyst.

The tailings-based zeolite@CDs-$TiO_2$ composite photocatalyst prepared by the above preparation method is applied for catalytic degradation of methylene blue.

Compared with the related art, the disclosure has the following beneficial effects.

Based on characteristics of tailings solid waste and a separation mechanism of photogenerated electrons and photogenerated holes in a composite semiconductor material, the disclosure provides an in-situ preparation method of the tailings-based zeolite@CDs-$TiO_2$ composite photocatalyst by photocatalytic oxidation flotation of tailings in a low alkalinity environment, and advantages of the method are as follows.

1. The tailings of the tailings-based zeolite@CDs-$TiO_2$ composite photocatalyst provided in the disclosure come from a steam coal preparation plant, and have a low cost and a wide source, and a preparation process of the tailings is convenient and reliable. Low value flotation tailings are used to prepare a composite photocatalyst, thereby realizing high-quality utilization and treating waste of waste.

2. In the disclosure, the tailings powder is used as a carbon source and a silicon aluminum source, various free radical reactions are generated through a photo-response characteristic of the titanium dioxide ($TiO_2$) under the condition of the ultraviolet irradiation, and carbon dots and coal-based zeolite silica-alumina gel are prepared in-situ. The tailings-based zeolite@CDs-$TiO_2$ composite photocatalyst is prepared through the hydrothermal reaction and a crystallization reaction, and it overcomes the problems of the titanium dioxide being used as a photocatalyst alone, such as severe recombination of the photogenerated electrons and the photogenerated holes, low quantum efficiency, and inability to effectively utilize sunlight.

An innovation of the disclosure is that the carbon dots can be used as an electronic slot and a sensitizer, to capture electrons excited by a semiconductor under longer wavelength illumination, and to prevent a recombination of an electron hole pair. The zeolite has rich pore structures, can provide more adsorption sites, and enhance a synergistic effect of adsorption-degradation. Meanwhile, an existence of the zeolite enhances a recyclability and a reusability of the composite photocatalyst, and promotes a development of sewage treatment field and the high-quality utilization of the coal-based solid waste.

Compared to pure titanium dioxide, the tailings-based zeolite@CDs-$TiO_2$ composite photocatalyst prepared in the disclosure has an efficient catalytic degradation effect to an organic pollutant under the longer wavelength illumination. Powder titanium dioxide catalyst particles are loaded on the tailings-based zeolite, which is beneficial for separation and recovery of a photocatalyst.

3. The tailings-based zeolite@CDs-$TiO_2$ composite photocatalyst prepared in the disclosure has been verified in an embodiment of a degradation treatment of methylene blue, and in the embodiment, the tailings-based zeolite@CDs-$TiO_2$ composite photocatalyst has a significant photocatalytic effect, a high photocatalytic activity, and a high degradation rate for an organic compound. The tailings-based zeolite@CDs-$TiO_2$ composite photocatalyst provided in the disclosure has advantages including a response wavelength redshift, and a high photocatalytic activity, thus the tailings-based zeolite@CDs-$TiO_2$ composite photocatalyst can be used in an environmental protection field, mainly used for treating the organic pollutants in water, and a removal rate of the methylene blue reaches 90.43 percents (%).

DETAILED DESCRIPTION OF EMBODIMENTS

Figure 1:
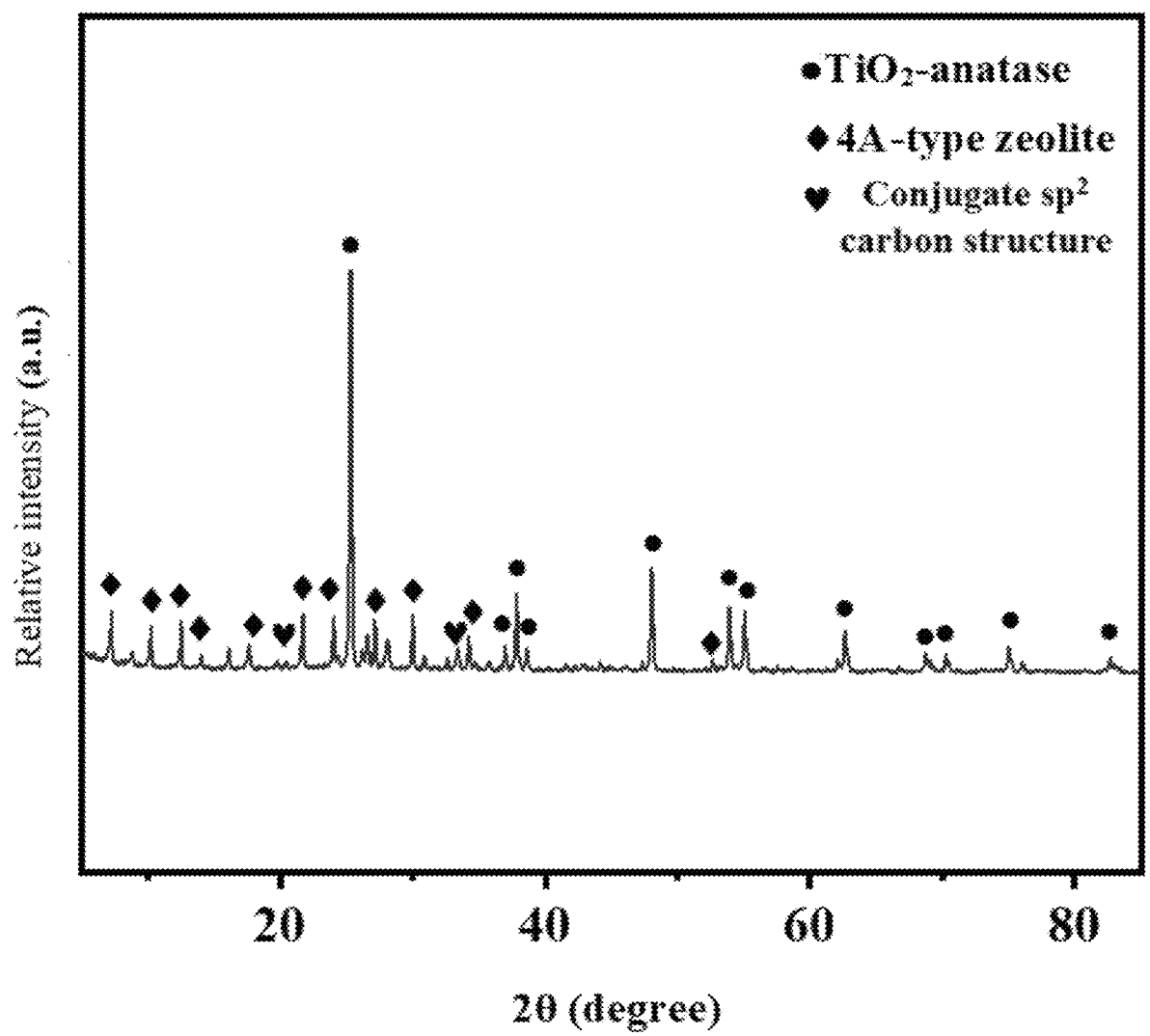
FIG. 1 illustrates an X-ray diffraction (XRD) diagram of a sample of a tailings-based zeolite@carbon dots-titanium dioxide (CDs-$TiO_2$) composite photocatalyst prepared in an embodiment 8 of the disclosure.

In order to make a technical problem to be solved, technical solutions and beneficial effects of the disclosure to be more clearly, the disclosure will be described in detail below in conjunction with embodiments and drawings. It should be understood that the embodiments described here are merely used to explain the disclosure, and not limited in the disclosure. The technical solutions of the disclosure will be described in detail below in conjunction with the embodiments and the drawings, but a scope of protection is not limited by this.

Embodiment 1

A preparation method of a tailings-based zeolite@carbon dots-titanium dioxide (CDs-TiO$_2$) composite photocatalyst is provided, and the preparation method includes the following steps 1-2.

In step 1, a pretreatment process of tailings is as follows. Tailings powder crushed to below 125 microns (μm) is added into diluted hydrochloric acid with a molar concentration of 0.1 molar per liter (M) to obtain a mixed solution, and an ultrasonic treatment is performed on the mixed solution for 2 hours (h). A suction filtration treatment is performed on the mixed solution after the ultrasonic treatment to obtain a substrate, the substrate is repeatedly washed by using deionized water to obtain the washed substrate, and the washed substrate is frozen and dried to obtain the dried substrate. Nitrogen (N$_2$) is introduced in a tube furnace, a flow speed of the N$_2$ is 100 milliliters per minute (mL/min), and the dried substrate is heated at a heating rate is 5 Celsius degrees per minute (° C./min) to a temperature of 800 Celsius degrees (° C.) and then the temperature is kept unchanged for 1 h, thus dark grey modified tailings powder is obtained.

In step 2, 1.0 gram (g) of titanium dioxide (TiO$_2$) is added in sodium hydroxide (NaOH) solution with a molar concentration of 2 M, after stirring evenly, 2.0 g of the modified tailings powder prepared in step 1 (i.e., a weight ratio of the TiO$_2$ and the modified tailings powder is 0.5) is added into the NaOH solution added with the TiO$_2$ and stirred for 15 minutes (min) to obtain a mixed suspension. The mixed suspension is added into a transparent high boron silicon tube, and is stirred and aged for 16 h under a condition of ultraviolet irradiation to obtain an aged suspension, and a light intensity of the ultraviolet irradiation is 10 milliwatts per square centimeter (mW/cm$^2$). The aged suspension is moved in a hydrothermal reactor to perform a hydrothermal reaction (a temperature of the hydrothermal reaction is 120° C., and a period of the hydrothermal reaction is 24 h) to obtain a product. The product is centrifuged and filtered to remove supernatant and to obtain a solid, the solid is washed to be neutral by using the deionized water to obtain a neutral solid, and the neutral solid is frozen and dried for 48 h to obtain the tailings-based zeolite@CDs-TiO$_2$ composite photocatalyst, i.e., the composite photocatalyst with a core of the tailings-based zeolite and a shell of the CDs-TiO$_2$.

Embodiment 2

A preparation method of a tailings-based zeolite@CDs-TiO$_2$ composite photocatalyst is provided, and the preparation method includes the following steps 1-2.

In step 1, the pretreatment process of tailings is as follows. The tailings powder crushed to below 125 m is added into the diluted hydrochloric acid with a molar concentration of 0.2 M to obtain the mixed solution, and the ultrasonic treatment is performed on the mixed solution for 2.5 h. The suction filtration treatment is performed on the mixed solution after the ultrasonic treatment to obtain the substrate, the substrate is repeatedly washed by using the deionized water to obtain the washed substrate, and the washed substrate is frozen and dried to obtain the dried substrate. The N$_2$ is introduced in the tube furnace, the flow speed of the N$_2$ is 120 mL/min, and the dried substrate is heated at a heating rate is 6° C./min to a temperature of 900° C. and then the temperature is kept unchanged for 1.5 h, thus the dark grey modified tailings powder is obtained.nm In step 2, 2.0 g of TiO$_2$ is added in the NaOH solution with a molar concentration of 2 M, after stirring evenly, 2.0 g of the modified tailings powder prepared in step 1 (i.e., the weight ratio of the TiO$_2$ and the modified tailings powder is 1) is added into the NaOH solution added with the TiO$_2$ and stirred for 15 min to obtain the mixed suspension. The mixed suspension is added into the transparent high boron silicon tube, and is stirred and aged for 8 h under the condition of the ultraviolet irradiation to obtain the aged suspension, and the light intensity of the ultraviolet irradiation is 10 mW/cm$^2$. The aged suspension is moved in the hydrothermal reactor to perform the hydrothermal reaction (the temperature of the hydrothermal reaction is 115° C., and the period of the hydrothermal reaction is 30 h) to obtain the product. The product is centrifuged and filtered to remove the supernatant and to obtain the solid, the solid is washed to be neutral by using the deionized water to obtain the neutral solid, and the neutral solid is frozen and dried for 40 h to obtain the tailings-based zeolite@CDs-TiO$_2$ composite photocatalyst.

Embodiment 3

A preparation method of a tailings-based zeolite@CDs-TiO$_2$ composite photocatalyst is provided, and the preparation method includes the following steps 1-2.

In step 1, the pretreatment process of tailings is as follows. The tailings powder crushed to below 125 m is added into the diluted hydrochloric acid with a molar concentration of 0.2 M to obtain the mixed solution, and the ultrasonic treatment is performed on the mixed solution for 1.5 h. The suction filtration treatment is performed on the mixed solution after the ultrasonic treatment to obtain the substrate, the substrate is repeatedly washed by using the deionized water to obtain the washed substrate, and the washed substrate is frozen and dried to obtain the dried substrate. The N$_2$ is introduced in the tube furnace, the flow speed of the N$_2$ is 90 mL/min, and the dried substrate is heated at a heating rate is 6° C./min to a temperature of 700° C. and then the temperature is kept unchanged for 1.5 h, thus the dark grey modified tailings powder is obtained.

In step 2, 2.0 g of TiO$_2$ is added in the NaOH solution with a molar concentration of 1 M, after stirring evenly, 2.0 g of the modified tailings powder prepared in step 1 (i.e., the weight ratio of the TiO$_2$ and the modified tailings powder is 1) is added into the NaOH solution added with the TiO$_2$ and stirred for 15 min to obtain the mixed suspension. The mixed suspension is added into the transparent high boron silicon tube, and is stirred and aged for 16 h under the condition of the ultraviolet irradiation to obtain the aged suspension, and the light intensity of the ultraviolet irradiation is 12 mW/cm$^2$. The aged suspension is moved in the hydrothermal reactor to perform the hydrothermal reaction (the temperature of the hydrothermal reaction is 120° C., and the period of the hydrothermal reaction is 24 h) to obtain the product. The product is centrifuged and filtered to remove the supernatant and to obtain the solid, the solid is washed to be neutral by using the deionized water to obtain the neutral solid, and the neutral solid is frozen and dried for 48 h to obtain the tailings-based zeolite@CDs-TiO$_2$ composite photocatalyst.

Embodiment 4

A preparation method of a tailings-based zeolite@CDs-TiO$_2$ composite photocatalyst is provided, and the preparation method includes the following steps 1-2.

In step 1, the pretreatment process of tailings is performed according to the embodiment 1.

In step 2, 2.0 g of TiO$_2$ is added in the NaOH solution with a molar concentration of 3 M, after stirring evenly, 2.0 g of the modified tailings powder prepared in step 1 (i.e., the weight ratio of the TiO$_2$ and the modified tailings powder is 1) is added into the NaOH solution added with the TiO$_2$ and stirred for 15 min to obtain the mixed suspension. The mixed suspension is added into the transparent high boron silicon tube, and is stirred and aged for 16 h under the condition of the ultraviolet irradiation to obtain the aged suspension, and the light intensity of the ultraviolet irradiation is 16 mW/cm$^2$. The aged suspension is moved in the hydrothermal reactor to perform the hydrothermal reaction (the temperature of the hydrothermal reaction is 120° C., and the period of the hydrothermal reaction is 24 h) to obtain the product. The product is centrifuged and filtered to remove the supernatant and to obtain the solid, the solid is washed to be neutral by using the deionized water to obtain the neutral solid, and the neutral solid is frozen and dried for 48 h to obtain the tailings-based zeolite@CDs-TiO$_2$ composite photocatalyst.

Embodiment 5

A preparation method of a tailings-based zeolite@CDs-TiO$_2$ composite photocatalyst is provided, and the preparation method includes the following steps 1-2.

In step 1, the pretreatment process of tailings is performed according to the embodiment 1.

In step 2, 2.0 g of TiO$_2$ is added in the NaOH solution with a molar concentration of 2 M, after stirring evenly, 2.0 g of the modified tailings powder prepared in step 1 (i.e., the weight ratio of the TiO$_2$ and the modified tailings powder is 1) is added into the NaOH solution added with the TiO$_2$ and stirred for 15 min to obtain the mixed suspension. The mixed suspension is added into the transparent high boron silicon tube, and the mixed suspension is stirred and aged for 8 h under the condition of the ultraviolet irradiation to obtain the aged suspension, and the light intensity of the ultraviolet irradiation is 18 mW/cm$^2$. The aged suspension is moved in the hydrothermal reactor to perform the hydrothermal reaction (the temperature of the hydrothermal reaction is 125° C., and the period of the hydrothermal reaction is 30 h) to obtain the product. The product is centrifuged and filtered to remove the supernatant and to obtain the solid, the solid is washed to be neutral by using the deionized water to obtain the neutral solid, and the neutral solid is frozen and dried for 48 h to obtain the tailings-based zeolite@CDs-TiO$_2$ composite photocatalyst.

Embodiment 6

A preparation method of a tailings-based zeolite@CDs-TiO$_2$ composite photocatalyst is provided, and the preparation method includes the following steps 1-2.

In step 1, the pretreatment process of tailings is performed according to the embodiment 1.

In step 2, 1.5 g of TiO$_2$ is added in the NaOH solution with a molar concentration of 2 M, after stirring evenly, 2.0 g of the modified tailings powder prepared in step 1 is added into the NaOH solution added with the TiO$_2$ and stirred for 15 min to obtain the mixed suspension. The mixed suspension is added into the transparent high boron silicon tube, and is stirred and aged for 12 h under the condition of the ultraviolet irradiation to obtain the aged suspension, and the light intensity of the ultraviolet irradiation is 20 mW/cm$^2$. The aged suspension is moved in the hydrothermal reactor to perform the hydrothermal reaction (the temperature of the hydrothermal reaction is 120° C., and the period of the hydrothermal reaction is 24 h) to obtain the product. The product is centrifuged and filtered to remove the supernatant and to obtain the solid, the solid is washed to be neutral by using the deionized water to obtain the neutral solid, and the neutral solid is frozen and dried for 48 h to obtain the tailings-based zeolite@CDs-TiO$_2$ composite photocatalyst.

Embodiment 7

A preparation method of a tailings-based zeolite@CDs-TiO$_2$ composite photocatalyst is provided, and the preparation method includes the following steps 1-2.

In step 1, the pretreatment process of tailings is performed according to the embodiment 1.

In step 2, 1.6 g of TiO$_2$ is added in the NaOH solution with a molar concentration of 2 M, after stirring evenly, 2.0 g of the modified tailings powder prepared in step 1 is added into the NaOH solution added with the TiO$_2$ and stirred for 15 min to obtain the mixed suspension. The mixed suspension is added into the transparent high boron silicon tube, and is stirred and aged for 10 h under the condition of the ultraviolet irradiation to obtain the aged suspension, and the light intensity of the ultraviolet irradiation is 20 mW/cm$^2$. The aged suspension is moved in the hydrothermal reactor to perform the hydrothermal reaction (the temperature of the hydrothermal reaction is 125° C., and the period of the hydrothermal reaction is 20 h) to obtain the product. The product is centrifuged and filtered to remove the supernatant and to obtain the solid, the solid is washed to be neutral by using the deionized water to obtain the neutral solid, and the neutral solid is frozen and dried for 40 h to obtain the tailings-based zeolite@CDs-TiO$_2$ composite photocatalyst.

Embodiment 8

A preparation method of a tailings-based zeolite@CDs-TiO$_2$ composite photocatalyst is provided, and the preparation method includes the following steps 1-2.

In step 1, the pretreatment process of tailings is performed according to the embodiment 1.

In step 2, 2.0 g of TiO$_2$ is added in the NaOH solution with a molar concentration of 2 M, after stirring evenly, 2.0 g of the modified tailings powder prepared in step 1 is added into the NaOH solution added with the TiO$_2$ and stirred for 15 min to obtain the mixed suspension. The mixed suspension is added into the transparent high boron silicon tube, and is stirred and aged for 16 h under the condition of the ultraviolet irradiation to obtain the aged suspension, and the light intensity of the ultraviolet irradiation is 20 mW/cm$^2$. The aged suspension is moved in the hydrothermal reactor to perform the hydrothermal reaction (the temperature of the hydrothermal reaction is 120° C., and the period of the hydrothermal reaction is 24 h) to obtain the product. The product is centrifuged and filtered to remove the supernatant and to obtain the solid, the solid is washed to be neutral by using the deionized water to obtain the neutral solid, and the neutral solid is frozen and dried for 48 h to obtain the tailings-based zeolite@CDs-TiO$_2$ composite photocatalyst.

The above are merely the embodiments of the disclosure and are not limited to a scope of its implementation. Any equivalent changes and modifications made in accordance with a scope of the disclosure should fall within a technical scope of the disclosure.

FIG. 1 illustrates an X-ray diffraction (XRD) diagram of a sample of the tailings-based zeolite@CDs-TiO$_2$ composite photocatalyst prepared in the embodiment 8. From FIG. 1, it can be seen that a weak diffraction peak exists near 2θ=24.3 degrees (°), and a structure of the tailings-based zeolite@CDs-TiO$_2$ composite photocatalyst is a conjugate sp$^2$ carbon structure, which indicates that synthesis of carbon dots is successful, however, a content of the carbon dots is low. Meanwhile, the TiO$_2$ is an anatase, a prepared coal-based zeolite is a 4A zeolite (Na$_2$O·Al$_2$O$_3$·2SiO$_2$·4.5H$_2$O), and a content is high and a crystallinity is high.

Figure 2:
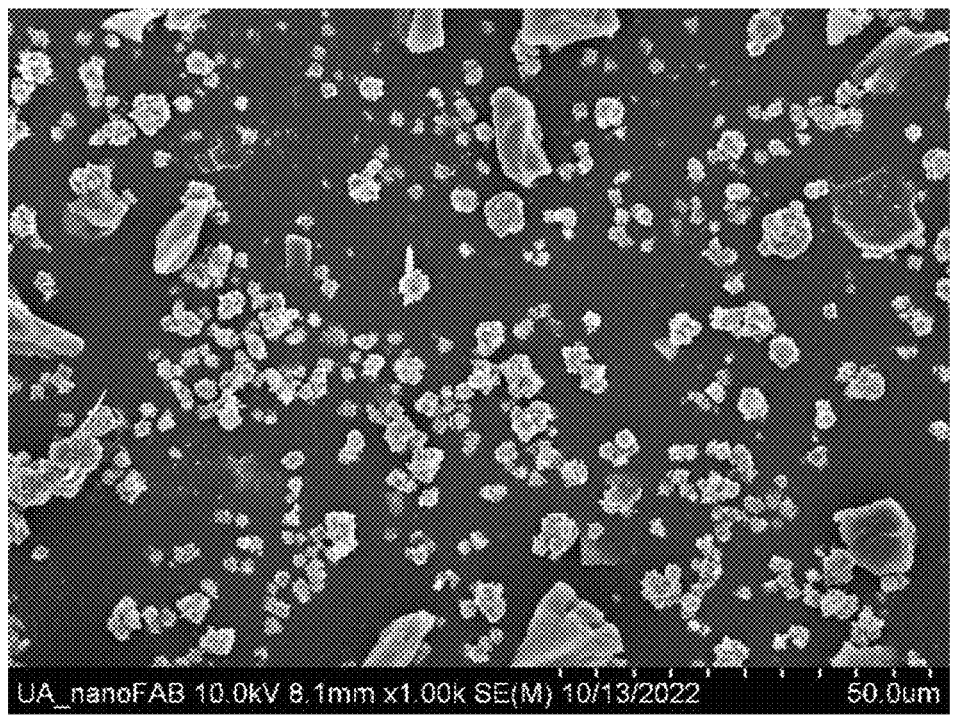
FIG. 2 illustrates a scanning electron microscopy diagram of the sample of the tailings-based zeolite@CDs-$TiO_2$ composite photocatalyst prepared in the embodiment 8 of the disclosure magnified by 1000 times.
Figure 3:
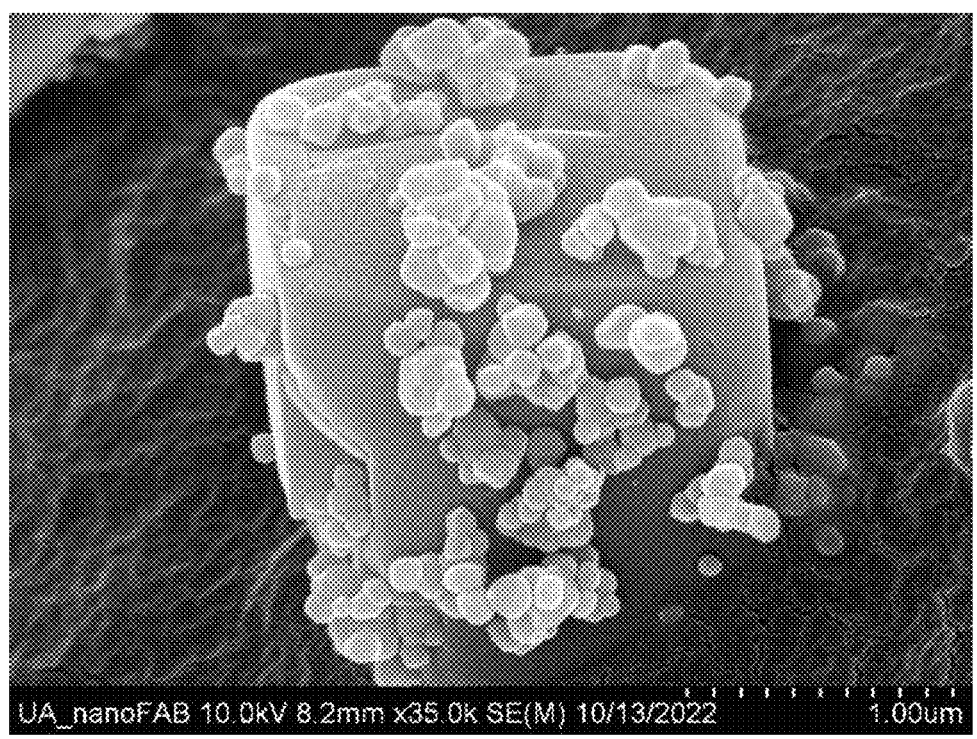
FIG. 3 illustrates a scanning electron microscopy diagram of the sample of the tailings-based zeolite@CDs-$TiO_2$ composite photocatalyst prepared in the embodiment 8 of the disclosure magnified by 35000 times.

FIG. 2 and FIG. 3 illustrate scanning electron microscopy diagrams of the sample of the tailings-based zeolite@CDs-TiO$_2$ composite photocatalyst prepared in the embodiment 8 at different multiples. As shown in FIG. 2 and FIG. 3, cubic 4A zeolite molecular sieves are generated in the product, and the cubic 4A zeolite molecular sieves are loaded with a large amount of titanium dioxide nanoparticles.

Figure 4:
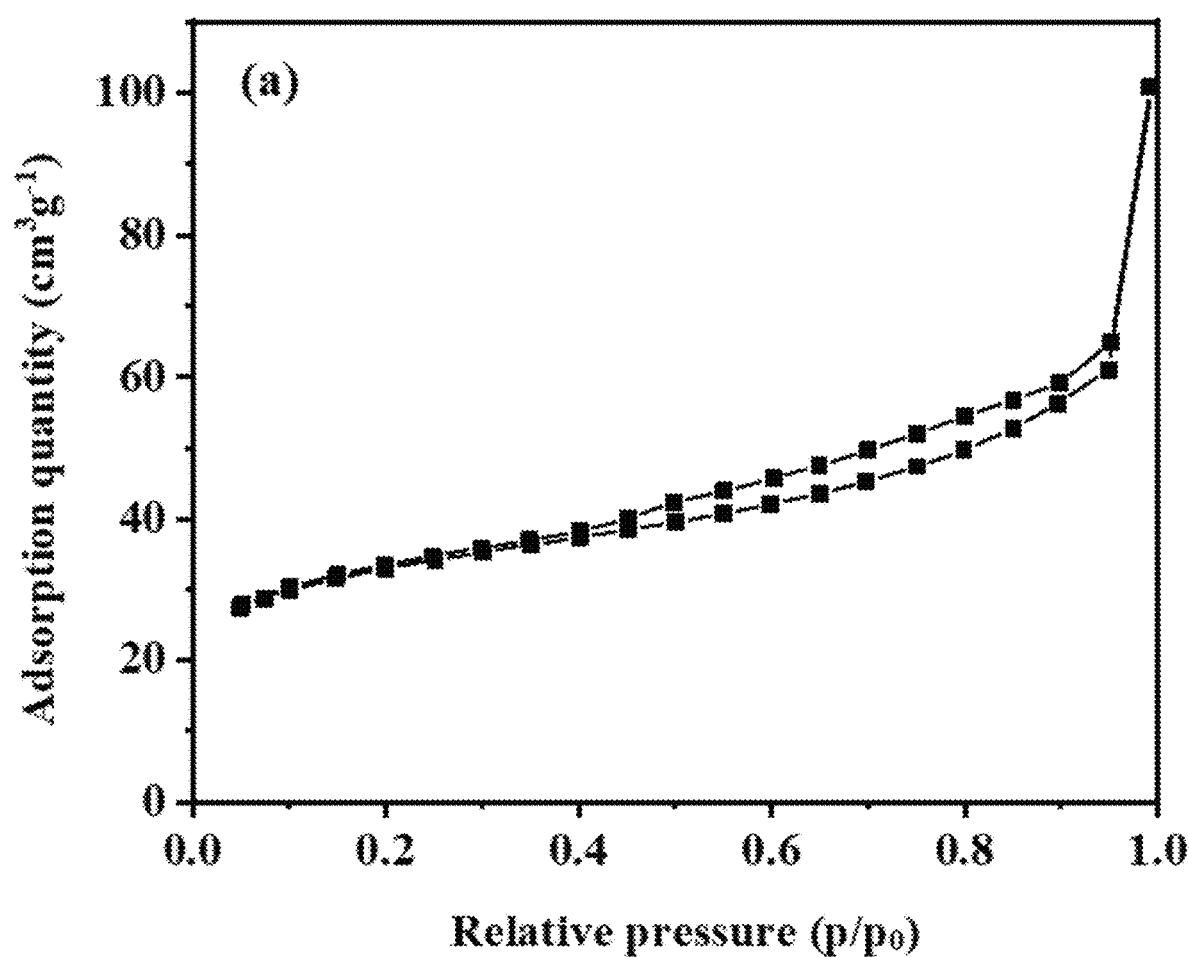
FIG. 4 illustrates a Brunauer-Emmet-Teller (BET) nitrogen adsorption diagram of the sample of the tailings-based zeolite@CDs-$TiO_2$ composite photocatalyst prepared in the embodiment 8 of the disclosure.
Figure 5:
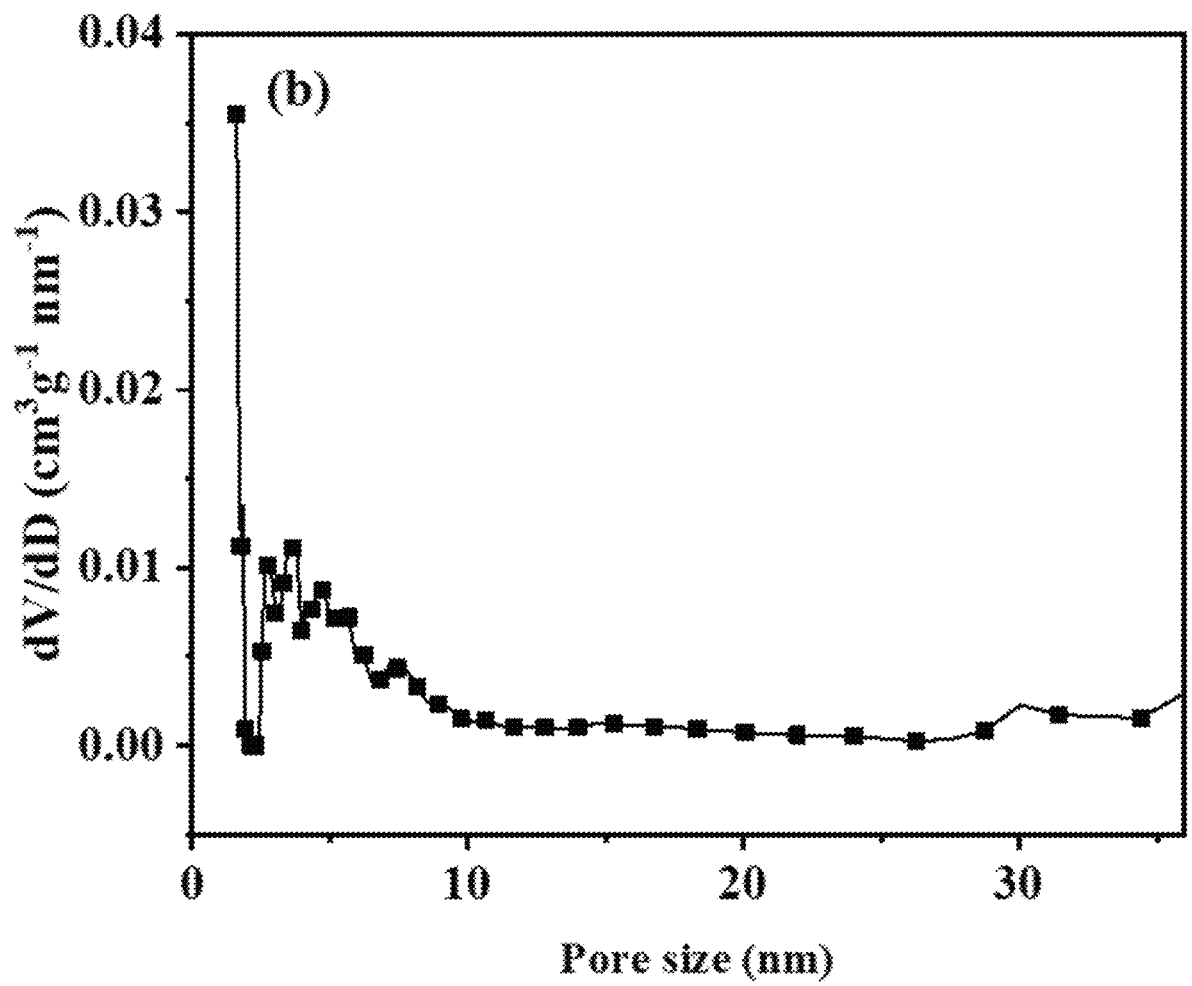
FIG. 5 illustrates a pore size distribution diagram of the sample of the tailings-based zeolite@CDs-$TiO_2$ composite photocatalyst prepared in the embodiment 8 of the disclosure.

FIG. 4 illustrates a Brunauer-Emmet-Teller (BET) nitrogen adsorption diagram of the sample of the tailings-based zeolite@CDs-TiO$_2$ composite photocatalyst prepared in the embodiment 8; and FIG. 5 illustrates a density function theory (DFT) pore size distribution diagram of the sample of the tailings-based zeolite@CDs-TiO$_2$ composite photocatalyst prepared in the embodiment 8. As shown in FIG. 4, an adsorption isotherm of the N$_2$ is type IV, which corresponds to its mesoporous characteristic. Furthermore, at relative pressure 0.4 to 0.9, an adsorption curve and a desorption curve have hysteresis loops with a large area, and the hysteresis loops may be related to condensation of the N$_2$ in partially open and hollow coal-based zeolites. From the DFT pore size distribution diagram of FIG. 5, it can be seen that a pore size of the tailings-based zeolite@CDs-TiO$_2$ composite photocatalyst is narrow and concentrated, and structural homogeneity of the tailings-based zeolite@CDs-TiO$_2$ composite photocatalyst is further confirmed.

Figure 6:
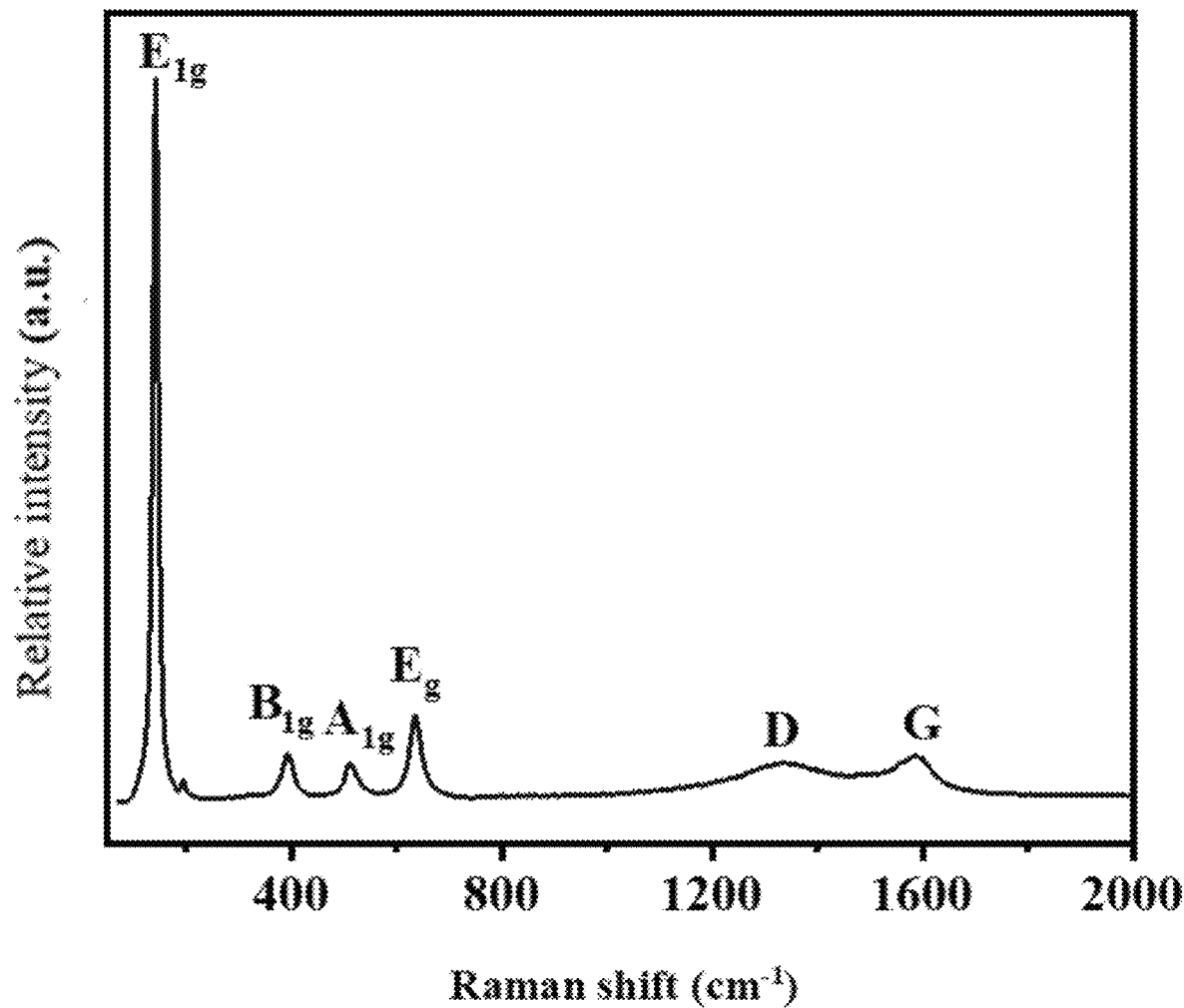
FIG. 6 illustrates a Raman spectra diagram of the sample of the tailings-based zeolite@CDs-$TiO_2$ composite photocatalyst prepared in the embodiment 8 of the disclosure.

FIG. 6 illustrates a Raman spectra diagram of the sample of the tailings-based zeolite@CDs-TiO$_2$ composite photocatalyst prepared in the embodiment 8. As shown in FIG. 6, a disorder (D) band and a graphitic (G) band are generated by sp$^3$ hybridization of carbon atoms and sp$^2$ plane vibration, and the D band and the G band are respectively appeared at 1336 centimeters$^{-1}$ (cm$^{-1}$) and 1586 cm$^{-1}$, which proves an existence of the carbon dots in the tailings-based zeolite@CDs-TiO$_2$ composite photocatalyst. Peaks appeared near 149 cm$^{-1}$, 394 cm$^{-1}$, 513 cm$^{-1}$, and 637 cm$^{-1}$ are $E_{1g}$ band, $B_{1g}$ band, $A_{1g}$ band, and $E_g$ band of anatase TiO$_2$.

Figure 7:
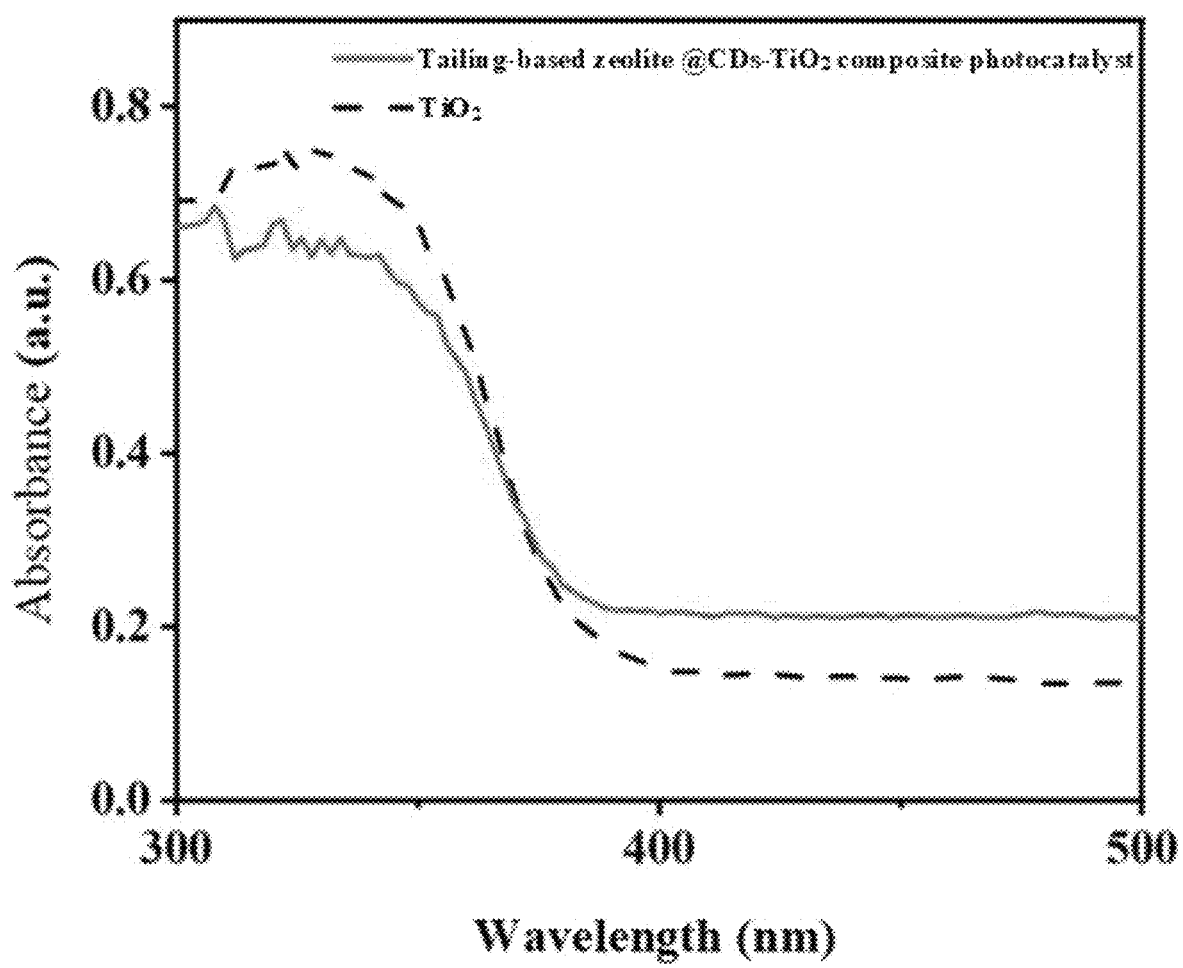
FIG. 7 illustrates an ultraviolet and visible spectrum (UV-vis) diagram of the sample of the tailings-based zeolite@CDs-$TiO_2$ composite photocatalyst prepared in the embodiment 8 of the disclosure.

FIG. 7 illustrates an ultraviolet and visible spectrum (UV-vis) diagram of the sample of the tailings-based zeolite@CDs-TiO$_2$ composite photocatalyst prepared in the embodiment 8. As shown in FIG. 7, compared to a pure anatase TiO$_2$, the tailings-based zeolite@CDs-TiO$_2$ composite photocatalyst shows a red shift in light response wavelength and an increase in visible light absorption.

Figure 8:
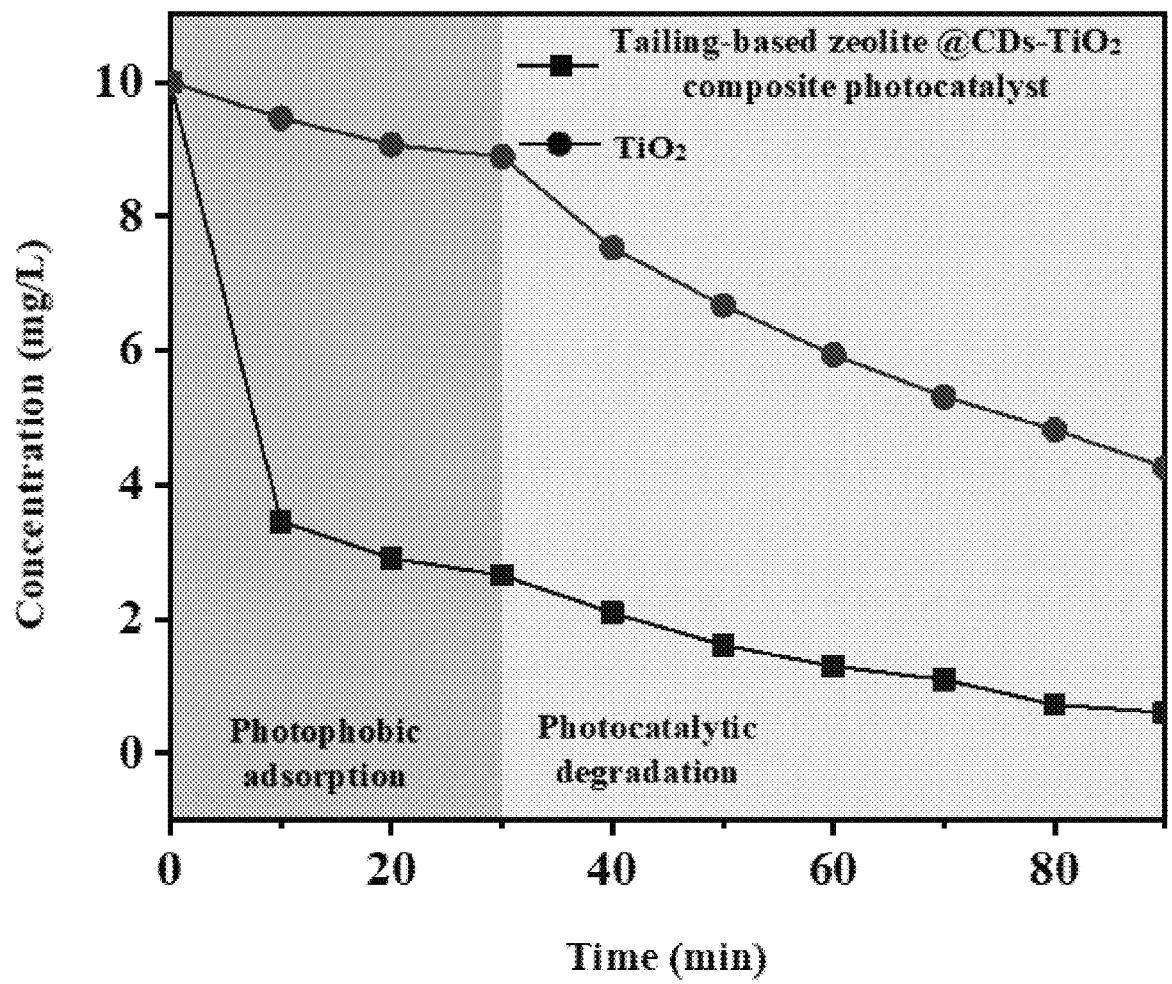
FIG. 8 illustrates a comparison schematic diagram of degradation effects of methylene blue with a concentration of 10 milligrams per liter (mg/L) degraded by the sample of the tailings-based zeolite@CDs-$TiO_2$ composite photocatalyst prepared in the embodiment 8 and a sample of pure anatase titanium dioxide under visible light irradiation.

FIG. 8 illustrates a comparison schematic diagram of degradation effects of methylene blue with a concentration of 10 milligrams per liter (mg/L) degraded by the sample of the tailings-based zeolite@CDs-TiO$_2$ composite photocatalyst prepared in the embodiment 8 and a sample of the pure anatase TiO$_2$ under visible light irradiation. As shown in FIG. 8, compared to the pure anatase TiO$_2$, a degradation efficiency of the tailings-based zeolite@CDs-TiO$_2$ composite photocatalyst to the methylene blue is higher, and the degradation efficiency reaches 90.43 percents (%). Meanwhile, the tailings-based zeolite@CDs-TiO$_2$ composite photocatalyst has stronger adsorption efficiency during a process of avoiding light adsorption, and the tailings-based zeolite@CDs-TiO$_2$ composite photocatalyst with a strong synergistic effect of adsorption-degradation is indicated.

Figure 9:
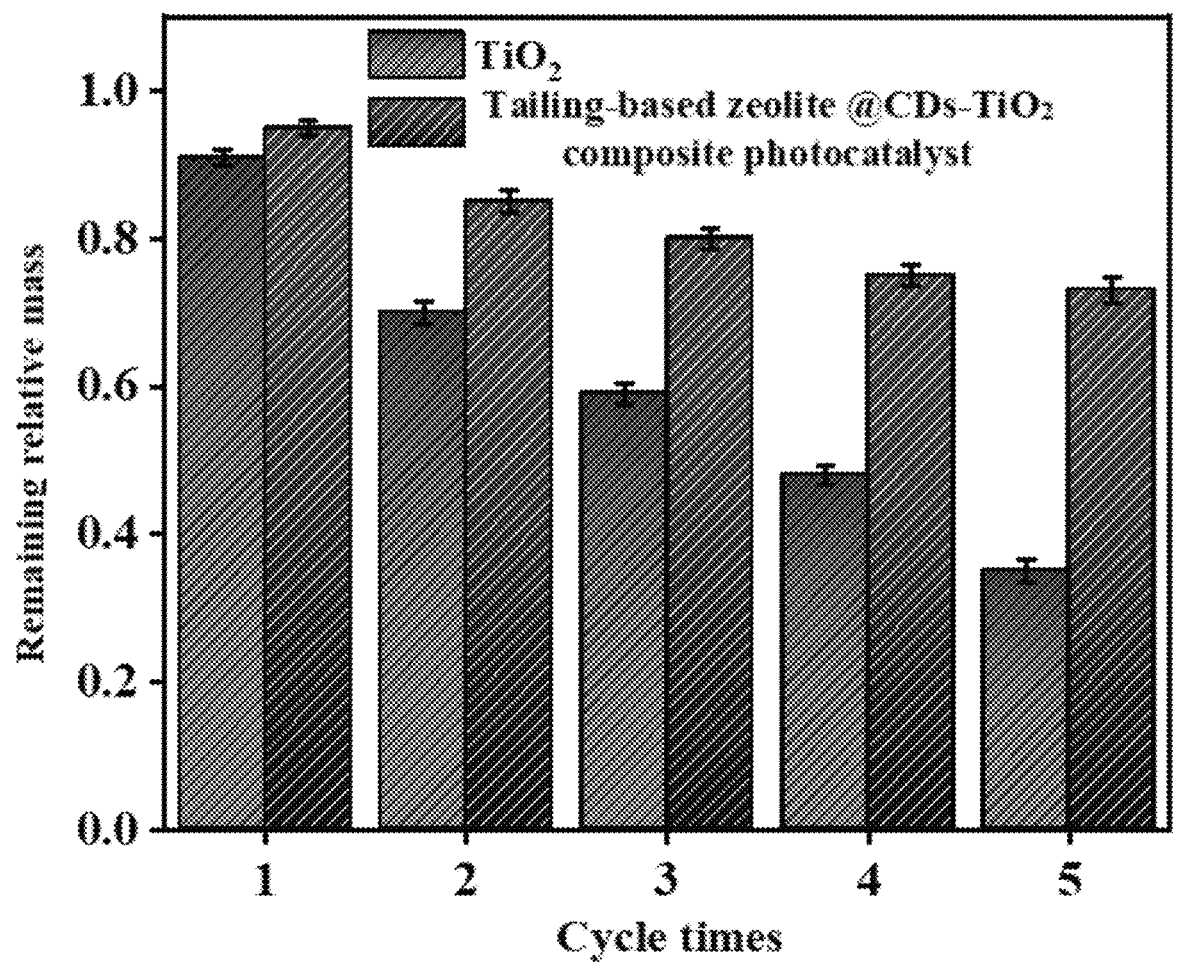
FIG. 9 illustrates a comparison schematic diagram of experimental results of recycling cycle photocatalysis of the sample of the tailings-based zeolite@CDs-$TiO_2$ composite photocatalyst prepared in the embodiment 8 and the sample of pure anatase titanium dioxide.

FIG. 9 illustrates a comparison schematic diagram of experimental results of recycling cycle photocatalysis of the sample of the tailings-based zeolite@CDs-TiO$_2$ composite photocatalyst prepared in the embodiment 8 and the sample of the pure anatase TiO$_2$. As shown in FIG. 9, compared to the pure anatase TiO$_2$, a recyclability of the tailings-based zeolite@CDs-TiO$_2$ composite photocatalyst is significantly superior, which proves an excellent reusability of the tailings-based zeolite@CDs-TiO$_2$ composite photocatalyst.

The above are merely a further detail description of the disclosure in conjunction with the embodiments, however, it cannot be determined that a specific implementation method of the disclosure is limited to this, for those skilled in the art, several simple deductions or substitutions can be made without departing from the disclosure, which should be considered as belonging to the scope of protection determined by the submitted claims.

What is claimed is:

1. A preparation method of a tailings-based zeolite@carbon dots-titanium dioxide (CDs-TiO$_2$) composite photocatalyst, comprising:
    step 1: tailings pretreatment, comprising: performing an acidification treatment on tailings powder by immersing the tailings powder into acid liquor and stirring evenly to obtain acidified tailings powder; roasting the acidified tailings powder at a temperature of 700-900 Celsius degrees (° C.) under a nitrogen (N$_2$) preservation and then keeping the temperature unchanged to obtain modified tailings powder; wherein the acidification treatment comprises: adding the tailings powder into diluted hydrochloric acid with a molar concentration of 1 molar per liter (M) and performing an ultrasonic treatment on the diluted hydrochloric acid added with the tailings powder for 1.5-2.5 hours (h);
    step 2: adding titanium dioxide (TiO$_2$) and the modified tailings powder into lye sequentially and stirring to obtain a mixed suspension, wherein a weight ratio of the TiO$_2$ and the modified tailings powder is in a range of 0.5-1; and stirring and aging the mixed suspension for 8-16 h under a condition of ultraviolet irradiation to obtain an aged suspension; wherein a light intensity of the ultraviolet irradiation is in a range of 10-20 milliwatts per square centimeter (mW/cm$^2$); and the lye is sodium hydroxide (NaOH) solution with a molar concentration of 1-3 M; and
    step 3: performing a hydrothermal reaction on the aged suspension to obtain a product, filtering the product to obtain a filtered product, and washing and drying the filtered product to obtain the tailings-based zeolite@CDs-TiO$_2$ composite photocatalyst; wherein a temperature of the hydrothermal reaction is in a range of 115-125° C., and a period of the hydrothermal reaction is in a range of 20-30 h.

2. The preparation method of the tailings-based zeolite@CDs-TiO$_2$ composite photocatalyst as claimed in claim 1, wherein a particle size of the tailings powder is smaller than 125 microns (μm).

3. The preparation method of the tailings-based zeolite@CDs-TiO$_2$ composite photocatalyst as claimed in claim 1, wherein the roasting comprises: introducing the N$_2$ into a tube furnace, heating the acidified tailings powder at a heating rate of 5 Celsius degrees per minute (° C./min) to the temperature of 700-900° C., and then roasting the acidified tailings powder at the temperature of 700-900° C.

4. The preparation method of the tailings-based zeolite@CDs-TiO$_2$ composite photocatalyst as claimed in claim 3, wherein a flow speed of the N$_2$ is 100 milliliters per minute (mL/min).

5. The preparation method of the tailings-based zeolite@CDs-TiO$_2$ composite photocatalyst as claimed in claim 3, wherein a period for keeping the temperature unchanged is 1 h.

6. The preparation method of the tailings-based zeolite@CDs-TiO$_2$ composite photocatalyst as claimed in claim 3, wherein the washing and drying in step 3 comprises: washing, by using deionized water, the filtered product to neutrality to obtain a washed product, and freezing and drying the washed product for 48 h to obtain the tailings-based zeolite@CDs-TiO$_2$ composite photocatalyst.

* * * * *